(12) United States Patent
Lasser

(10) Patent No.: US 8,200,904 B2
(45) Date of Patent: Jun. 12, 2012

(54) SYSTEM AND METHOD FOR CLEARING DATA FROM A CACHE

(75) Inventor: Menahem Lasser, Kohav-Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 812 days.

(21) Appl. No.: 11/954,946

(22) Filed: Dec. 12, 2007

(65) Prior Publication Data

US 2009/0157974 A1 Jun. 18, 2009

(51) Int. Cl.
G06F 12/08 (2006.01)
(52) U.S. Cl. .......................................... 711/135; 711/103
(58) Field of Classification Search .................. 711/103, 711/133
See application file for complete search history.

(56) References Cited

U.S. PATENT DOCUMENTS

| | | | |
|---|---|---|---|
| 4,607,346 A | 8/1986 | Hill | |
| 5,636,355 A | 6/1997 | Ramakrishnan et al. | |
| 5,778,392 A | 7/1998 | Stockman et al. | |
| 5,883,904 A | 3/1999 | Arimilli et al. | |
| 5,895,488 A | 4/1999 | Loechel | |
| 5,930,167 A | 7/1999 | Lee et al. | |
| 5,937,425 A | 8/1999 | Ban | |
| 6,363,009 B1 | 3/2002 | Fukuzumi | |
| 6,412,045 B1* | 6/2002 | DeKoning et al. | 711/135 |
| 6,678,785 B2 | 1/2004 | Lasser | |
| 6,976,128 B1 | 12/2005 | Williams et al. | |
| 7,076,605 B1 | 7/2006 | Son | |
| 7,124,272 B1 | 10/2006 | Kennedy et al. | |
| 7,865,658 B2 | 1/2011 | Lasser et al. | |
| 2003/0200400 A1 | 10/2003 | Nangle | |
| 2004/0073751 A1 | 4/2004 | Horrigan et al. | |
| 2005/0055512 A1* | 3/2005 | Kishi | 711/135 |
| 2005/0172082 A1* | 8/2005 | Liu et al. | 711/144 |
| 2005/0193025 A1 | 9/2005 | Mosek | |
| 2005/0251617 A1 | 11/2005 | Sinclair et al. | |
| 2005/0256838 A1 | 11/2005 | Lasser | |
| 2007/0061502 A1 | 3/2007 | Lasser et al. | |
| 2007/0118698 A1* | 5/2007 | LaFrese et al. | 711/141 |

(Continued)

FOREIGN PATENT DOCUMENTS

| | | |
|---|---|---|
| EP | 1 653 340 A1 | 5/2006 |
| WO | 2008/121206 A1 | 10/2008 |

OTHER PUBLICATIONS

International Search Report issued in International Application No. PCT/US2008/086247 on Jul. 27, 2009 (6 pages).

(Continued)

*Primary Examiner* — Kaushikkumar Patel
(74) *Attorney, Agent, or Firm* — Brinks Hofer Gilson & Lione

(57) ABSTRACT

A system and method for clearing data from a cache is disclosed. The method may include the steps of receiving data at a cache of a self-caching storage device, determining a cost-effectiveness of flushing a logical block from the cache and, if the current available capacity of the cache is greater than a minimum capacity parameter, only flushing the logical block if a predetermined criteria is met, regardless of whether the storage device is idle. The system may include a cache storage, a main storage and a controller configured to only flush a logical block from the cache if a determined cost effectiveness meets a predetermined criteria when the current available capacity of the cache is greater than a minimum capacity parameter.

26 Claims, 3 Drawing Sheets

U.S. PATENT DOCUMENTS

| | | |
|---|---|---|
| 2007/0150693 A1* | 6/2007 | Kaneko et al. ............. 711/202 |
| 2007/0239927 A1 | 10/2007 | Rogers et al. |
| 2007/0250660 A1* | 10/2007 | Gill et al. ............. 711/103 |
| 2007/0283081 A1 | 12/2007 | Lasser |
| 2008/0126680 A1 | 5/2008 | Lee et al. |
| 2008/0140918 A1 | 6/2008 | Sutardja |
| 2008/0215800 A1 | 9/2008 | Lee et al. |
| 2008/0222348 A1 | 9/2008 | Mosek |
| 2008/0235432 A1 | 9/2008 | Chen et al. |
| 2008/0244164 A1 | 10/2008 | Chang et al. |
| 2008/0244202 A1 | 10/2008 | Gorobets et al. |
| 2008/0307158 A1 | 12/2008 | Sinclair |
| 2008/0307192 A1 | 12/2008 | Sinclair et al. |
| 2009/0172286 A1 | 7/2009 | Lasser et al. |
| 2010/0169540 A1 | 7/2010 | Sinclair |
| 2010/0169541 A1 | 7/2010 | Freikorn |

OTHER PUBLICATIONS

Written Opinion issued in International Application No. PCT/US2008/086247 on Jul. 27, 2009 (4 pages).

Notice of Allowance issued in U.S. Appl. No. 11/967,369 on May 18, 2010 (5 pages).

U.S. Appl. No. 11/876,893, filed Oct. 23, 2007.

Yim, Keun Soo, "A Novel Memory Hierarchy for Flash Memory Based Storage Systems", Journal of Semiconductor Technology and Science, v5 i4, pp. 262-269, 2005.

Chang, Li-Pin, "Hybrid Solid-State Disks: Combining Heterogeneous NAND Flash in Large SSDs", Design Automation Conference, Mar. 21-24, 2008, pp. 428-433.

Office Action issued in U.S. Appl. No. 12/345,992, on Oct. 24, 2011 (11 pages).

Office Action issued in U.S. Appl. No. 12/345,992 on Mar. 14, 2011 (9 pages).

Office Action issued in U.S. Appl. No. 12/345,990 on Sep. 21, 2011 (18 pages).

Office Action issued in U.S. Appl. No. 12/345,990 on Feb. 25, 2011 (16 pages).

* cited by examiner

SYSTEM AND METHOD FOR CLEARING DATA FROM A CACHE

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Two general memory cell architectures found in flash memory include NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell.

The responsiveness of flash memory cells typically changes over time as a function of the number of times the cells are erased and re-programmed. As this generally results in the memory cells becoming less reliable, the memory cells may need higher voltages for erasing and programming as they age. The effective threshold voltage window over which the memory states may be programmed can also decrease as a result of this charge retention. The result is a limited effective lifetime of the memory cells. Specifically, blocks of memory cells may be subjected to only a preset number of Write and Erase cycles before they are mapped out of the system. The number of cycles to which a flash memory block is desirably subjected may depend upon the particular structure of the memory cells, the amount of the threshold window that is used for the storage states, the extent of the threshold window usually increasing as the number of storage states of each cell is increased. Depending upon these and other factors, the number of lifetime cycles can be as low as 10,000 and as high as 100,000 or even several hundred thousand.

Continual erasing and re-programming of data sectors in a relatively few logical block addresses may occur where the host continually updates certain sectors of housekeeping data stored in the memory, such as file allocation tables (FATs) and the like. Specific applications can also cause a few logical blocks to be re-written much more frequently than others with user data. Therefore, in response to receiving a command from the host to write data to a specified logical block address, the data are written to one of a few blocks of a pool of erased blocks. That is, instead of re-writing the data in the same physical block where the original data of the same logical block address resides, the logical block address is remapped into a block of the erased block pool. The block containing the original and now invalid data is then erased either immediately or as part of a later garbage collection operation, and then placed into the erased block pool. The result is that even when data in only a few logical block addresses are being updated much more than other blocks, instead of a relatively few physical blocks of the system being cycled with a higher rate, the cycling is evenly spread over many physical blocks. This technique is known in the prior art as "wear leveling".

In flash memory management systems that employ self-caching, there is the question of when to schedule cache flushing operations. In cache flushing operations, a portion of the data in the cache, typically data corresponding to a common logical block, is copied from the cache to the main storage area and then removed from the cache to make room for new input data in the cache. Removal from the cache does not necessarily require an immediate erasing of the copied data, but may be accomplished by setting flags indicating that data is not needed any more so that the flagged data may be erased when the space is needed. Flushing from the cache, even if immediate erasure of the data from physical cache blocks is not required, does lead to using up a Write/Erase cycle.

Different cached systems employ different policies regarding the scheduling of cache flushing operations and regarding the selection of the specific data to be flushed. Typically, the factors effecting the scheduling decisions are how full the cache is, and whether there are access requests arriving from the host that have to be serviced. When deciding to schedule a cache flushing operation and having to select which logical block is to be selected among the multiple logical blocks that may currently have data in the cache, a consideration is how efficient is the flushing of a logical block. In this context, efficiency of block flushing means how many "parasitic" writing operations will be required for flushing the block.

As an example of the "block flushing efficiency" concept, consider a scenario where a block contains 128 pages. In this example, is assumed that the flash management algorithms of the storage system require that all physical blocks in the main storage area (excluding the cache area) must always be full and allocated to a single logical block. If all the pages of the logical block X are located in the main area, and not in the cache, then all the data of logical block X is located in a single physical block Y. Now suppose the host updated 100 pages in logical block X, and they were all stored into the cache. When now flushing logical block X out of the cache, a free physical block Z is allocated and filled with 128 pages, 100 of which are copied from the cache and 28 are copied from physical block Y. So in this example, 28 parasitic page write operations were performed that did not directly contribute to clearing area of the cache but were nonetheless needed to support the integrity of the flash management system. While the above example describes a specific and not very complex example of a flash management system, the concepts of parasitic write operations and efficiency of flushing operations are relevant for any cached flash system.

Prior art flash memory management systems that use self-caching typically use such flushing efficiency criterion in their decision process in one form or another. Prior art systems may also use block flushing efficiency to affect scheduling of flushing operations when the flash memory management system is busy with host requests and multiple logical blocks are competing for selection to be flushed. If the flash memory management system is idle (in the sense that the host does not access it) and there are a few logical blocks having data in the cache, then the blocks will be selected for flushing one by one and eventually all of them will be flushed out, leaving an empty cache. When the storage system is idle with respect to host requests, the flash memory management system will typically flush all data in the cache so that the cache is better prepared for a possible future burst of host activity. While this can be a reasonable cache flushing policy to adopt when the main concern is maintaining a short response time of the storage system to host requests, this type of cache flushing policy can create a problem with respect to the endurance and reliability of the flash storage system.

As noted above, there is generally a limit to the number of Write/Erase cycles that are supported and guaranteed by the manufacturers of flash devices. Recent generations of flash devices have brought that number of cycles down, due to the smaller dimensions of the memory cells, and due to the use of multi-bit per cell technologies that can make memory cells more sensitive to various disturbances. By applying the above cache flushing policy, where if the flash device is idle logical blocks may be flushed that have very little data in the cache, a very low flushing efficiency will result. For example, if a storage system starts with an empty cache, a host updates 10 pages of a single logical block and then the host stops for a while, the only logical block represented in the cache has 10 pages cached. If the host is now idle, this logical block will be flushed out resulting in Write/Erase cycle "spent" for absorbing only 10 pages instead of the 128 pages (again assuming a 128 page block size) that could theoretically "share" this Write/Erase cycle. If this host access pattern is a typical one, the storage system will reach its end of life (with all physical blocks cycled to their limit) after writing less than 10% of the amount of data it could theoretically absorb. Such low-efficiency flushing eats into the limited number of Write/Erase cycles of the physical blocks and shortens the lifetime of the storage system.

SUMMARY

In order to address the problem of prematurely wearing out the limited Write/Erase cycles of flash memory due to the cache flushing policy of prior systems, a system and method for implementing an improved cache flushing policy is disclosed.

According to a first aspect of the invention, a method is disclosed for a storage device in which incoming data received in write commands from an external host are first stored in a cache storage and later moved to a main storage. The method of managing movement of data from the cache storage to the main storage includes storing data received from the external host in the cache storage and determining a cost-effectiveness to copy at least a portion of the stored data from the cache storage to the main storage. The method also includes, if an available capacity of the cache storage is greater than a minimum capacity parameter, copying the at least a portion of the stored data from the cache storage to the main storage only if the cost-effectiveness to copy the portion of the stored data satisfies a predetermined criterion.

In another aspect of the invention, a method for implementing a cache clearing policy includes receiving data from an external host at a storage device and storing the received data in the cache storage. The method then includes the steps of determining a cost-effectiveness to copy at least a portion of the stored data from the cache storage to the main storage and if an available capacity of the cache storage is greater than a minimum capacity parameter, preventing copying of the portion of the stored data from the cache storage to the main storage while the storage device is in an idle state unless the determined cost-effectiveness meets a predetermined criterion.

According to another aspect of the invention, a method of managing movement of data in a storage device having a cache storage and a main storage is disclosed including steps of receiving at the storage device a data write command from a host, storing data received with the data write command in the cache storage and detecting an available capacity in the cache storage. If the detected available capacity is less than a minimum capacity parameter, then the storage device copies at least a portion of the stored data from the cache storage to the main storage. If the detected available capacity is greater than or equal to the minimum capacity parameter, then the storage device determines a cost-effectiveness of copying the portion of the stored data from the cache storage to the main storage based on at least two parameters relating to the portion of the stored data in the cache storage and copies the portion of the stored data only if the determined cost-effectiveness satisfies a predetermined criterion.

In other aspects of the invention, a processor readable medium is disclosed having processor executable instructions for carrying out the above-described methods.

In yet another aspect of the invention, a storage device is disclosed that includes a cache storage configured for receiving data associated with host write commands and a main storage in communication with the cache storage that is configured to receive data transferred from the cache storage. A controller in the storage device is arranged to manage transfer of the data associated with host write commands from the cache storage to the main storage. The controller is configured to determine a cost-effectiveness to copy at least a portion of the stored data from the cache storage to the main storage and, if an available capacity of the cache storage is greater than a minimum capacity parameter, to copy the portion of the data to the main storage only if the cost-effectiveness satisfies a predetermined criterion.

In another aspect of the invention, a storage device includes a cache storage configured for receiving data associated with host write commands and a main storage in communication with the cache storage for receiving data transferred from the cache storage. The storage device also includes a controller configured to receive data at the storage device from an external host, store the received data in the cache storage and determine a cost effectiveness to copy at least a portion of the stored data from the cache storage to the main storage. The controller is further configured to prevent copying of the portion of the stored data to the main storage while the storage device is in an idle state unless the determined cost effectiveness satisfies a predetermined criterion or a current available capacity of the cache storage is less than a minimum capacity.

BRIEF DESCRIPTION OF THE PRESENTLY PREFERRED EMBODIMENTS

Figure 1:
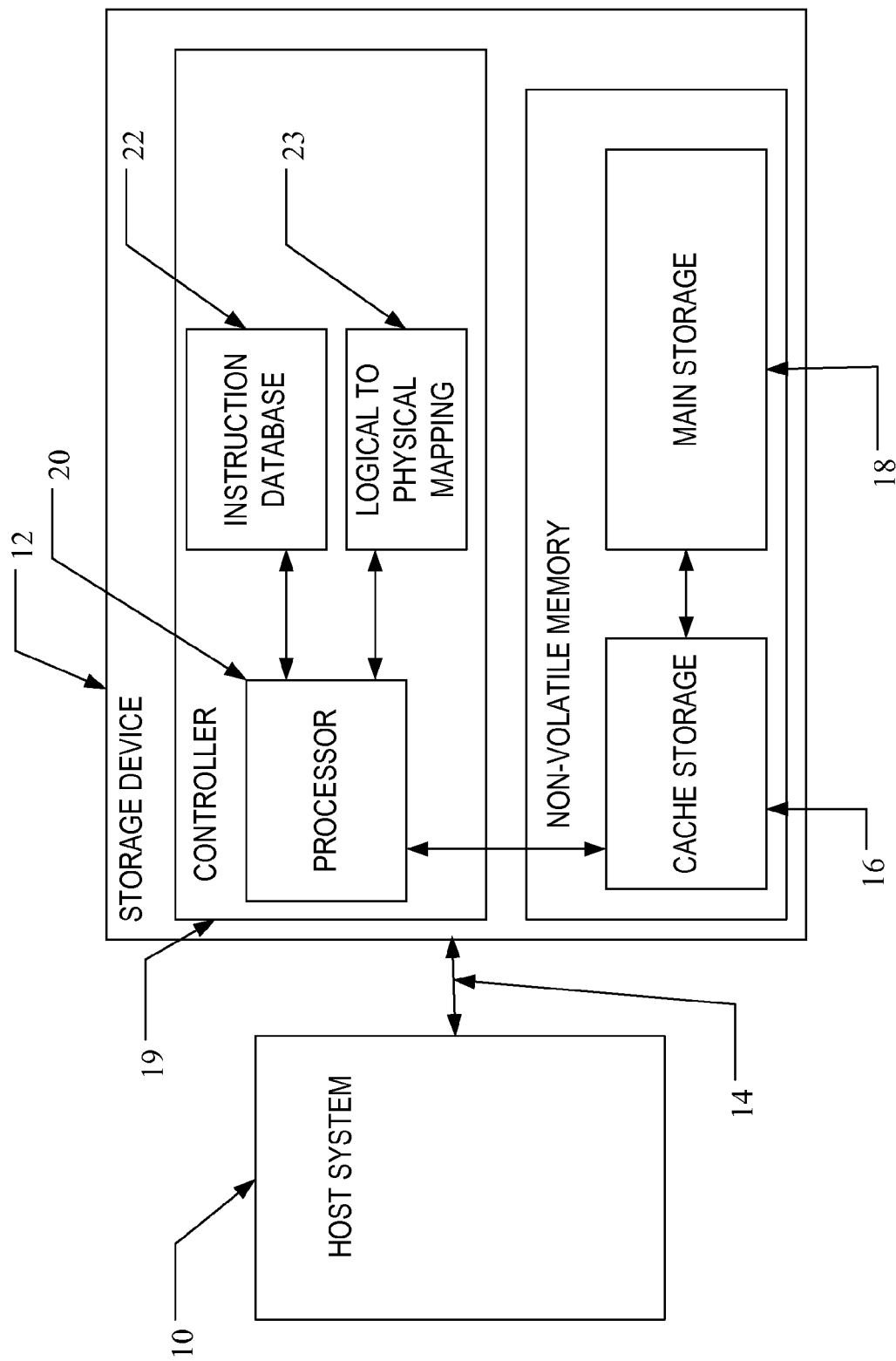
FIG. 1 is a block diagram of a self-caching memory system.

A flash memory system suitable for use in implementing aspects of the invention is shown in FIG. 1. A host system 10 stores data into, and retrieves data from, a self-caching flash storage device 12. The storage device 12 may be embedded in the host or may exist in the form of a card or other removable drive that is removably connected to the host 10 through a mechanical and electrical connector. The host 10 may be any of a number of data generating devices, such as a personal computer. The host 10 communicates with the storage device over a communication channel 14.

The storage device 12 contains non-volatile memory cells that are arranged as cache storage 16 and main storage 18. The cache storage 16 and main storage 18 may be made up of the same type of flash memory cell or different types of flash memory cells. For example, the cache storage 16 may be configured in a single level cell (SLC) type of flash configuration while the main storage 18 may consist of a multi-level cell (MLC) type flash memory configuration to take advantage of the higher write speed of SLC flash and the higher density of MLC flash. Different combinations of flash memory types are also contemplated for the cache storage 16 and main storage 18. Examples of suitable self-caching flash memory configurations that may be adapted to implement the cache flushing policies described herein are disclosed in U.S. Pat. No. 5,930,167 to Lee et al. and in U.S. application Ser. No. 11/318,906 to Lasser et al., both of which are incorporated herein by reference in their entirety. The storage device 12 also includes a controller 19 that may include a processor 20, instructions 22 for operating the processor 20 and a logical block to physical block translation table 23.

Figure 2:
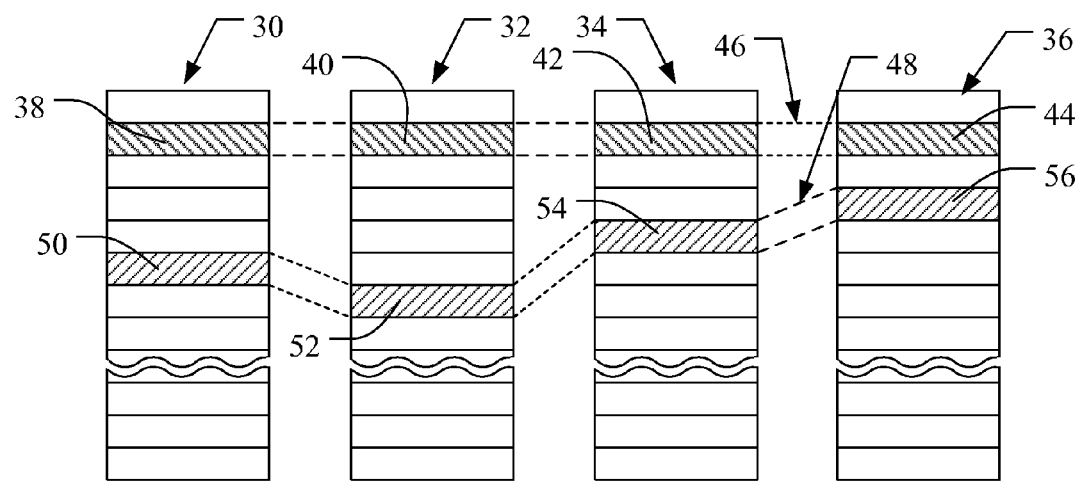
FIG. 2 illustrates an example physical memory organization of the system of FIG. 1.

The cache storage 16 and main storage 18, as mentioned above, may be non-volatile flash memory arranged in blocks of memory cells. A block of memory cells is the unit of erase, i.e., the smallest number of memory cells that are physically erasable together. For increased parallelism, however, the blocks may be operated in larger metablock units. One block from each plane of memory cells may be logically linked together to form a metablock. In a storage device where the cache storage 16 is in an SLC configuration and the main storage 18 is in an MLC configuration, a metablock arrangement is useful because multiple cache blocks may be needed to store an amount of data equal to one main storage block. Referring to FIG. 2, a conceptual illustration of a representative flash memory cell array is shown. Four planes or sub-arrays 30, 32, 34 and 36 memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 38, 40, 42 and 44, located in respective planes 30, 32, 34 and 36. There may be dozens or hundreds of blocks in each plane. Blocks may be logically linked together to form a metablock that may be erased as a single unit. For example, blocks 38, 40, 42 and 44 may form a first metablock 46. The blocks used to form a metablock need not be restricted to the same relative locations within their respective planes, as is shown in the second metablock 48 made up of blocks 50, 52, 54 and 56.

Figure 3:
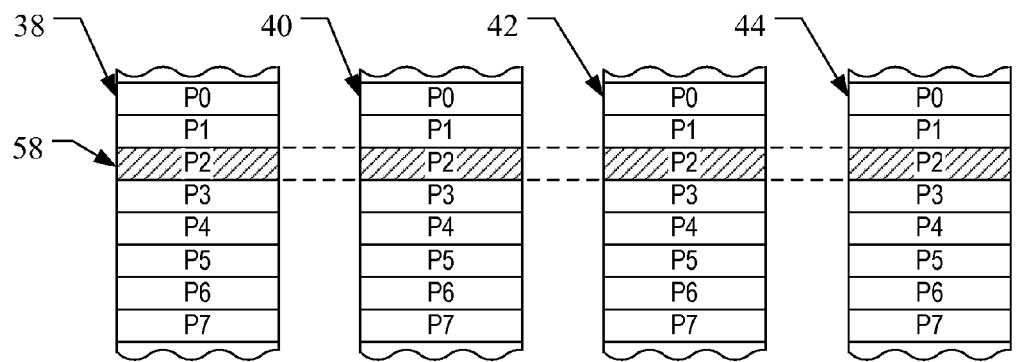
FIG. 3 shows an expanded view of a portion of the physical memory of FIG. 2.

The individual blocks are in turn divided for operational purposes into pages of memory cells, as illustrated in FIG. 3. The memory cells of each of blocks 38, 40, 42, and 44, for example, are each divided into eight pages P0-P7. Alternately, there may be 16, 32 or more pages of memory cells within each block. A page is the unit of data programming and reading within a block, containing the minimum amount of data that are programmed or read at one time. A metapage 58 is illustrated in FIG. 3 as formed of one physical page for each of the four blocks 38, 40, 42 and 44. The metapage 58 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 10. The LBAs are then mapped to one or more physical blocks in the storage device 12 where the data is physically stored.

In operation, the cache storage 16 of the storage device 12 will receive data from the host 10 associated with host write commands. The data received at the cache storage 16 is addressed in logical blocks of addresses by the host and, when the data is stored in cache storage 16, the data associated with a given logical block of addresses may be stored in a single physical block in the cache storage 16 or dispersed over multiple different physical blocks in the cache storage 16. The processor 20 tracks the mapping of logical addresses to physical addresses in a logical to physical mapping table 23. The processor 20, implementing a cache flushing policy based on processor executable instructions in the instructions database 22, will look at logical blocks of data to determine if the portion of the data residing in the cache storage 16 that corresponds to a particular logical block will be copied to the main storage 18. Examples of flash management systems that may be modified to incorporate the cache flushing policy disclosed herein may be found in U.S. Pat. No. 5,937,425 to Ban and U.S. Pat. No. 6,678,785 to Lasser, and the entirety of each of these patents is hereby incorporated by reference.

As is discussed in more detail below, in order to reduce wear on the memory cells of the cache storage 16 and main storage 18, a cache flushing policy is set forth that avoids forcing the cache storage 16 to become fully empty even if the storage device 12 is idle for a long period of time. This may be accomplished through the creation of a cost-effectiveness criterion for flushing out a logical block so that copying data associated with the logical block out of the cache storage 16 is not performed unless a required cost-effectiveness is met, regardless of whether the storage device 12 is idle. The storage device 12 is considered idle for any period of time when the storage device 12 is not receiving data from the host 10 or otherwise being accessed by the host.

Figure 4:
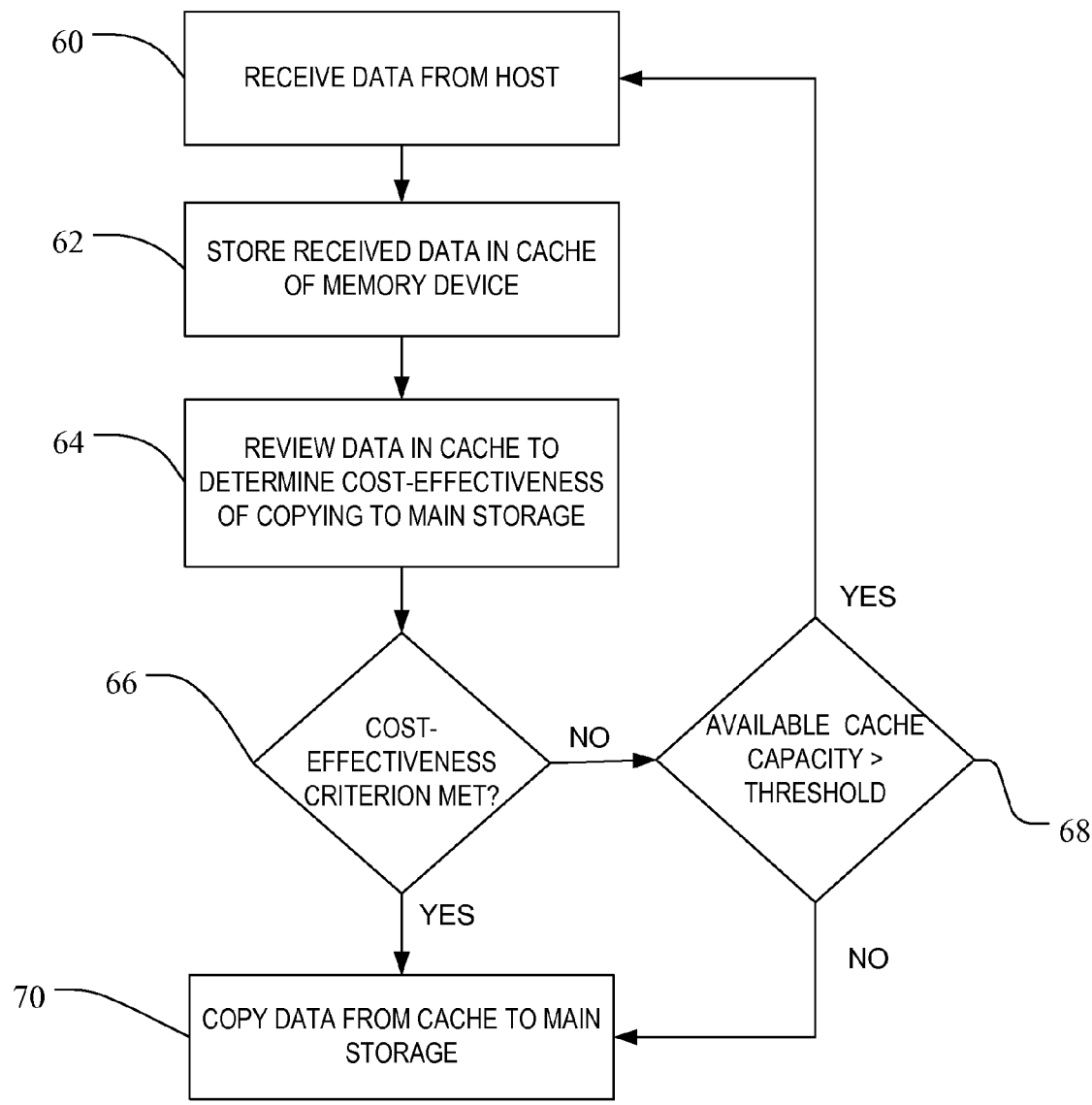
FIG. 4 is a flow diagram illustrating a method of implementing a cache clearing policy according to a preferred embodiment.

Referring to FIG. 4, a flow diagram illustrates one method of implementing this cost-effectiveness review for cache flushing. First, data is received from the host device 10 (at 60). The received data is stored in the cache storage 16 (at 62). The processor 20, based on instructions 22 containing the cost-effectiveness criteria, determines a cost-effectiveness of copying data from the cache storage 16 to the main storage 18 whenever a logical block is being considered for flushing (at 64). The cost-effectiveness test may be a function of the efficiency of flushing the logical block, where the higher the efficiency, the more cost-effective flushing the block would be. In one embodiment, for example, the efficiency alone of flushing a particular logical block may be sufficient to meet a predetermined criterion of cost-effectiveness if that efficiency is equal to or greater to a threshold amount. For example, the predetermined criterion may be a flushing efficiency of greater than equal to 50%, where if the logical blocks for the storage device had a size of 128 pages, a logical block would have to correspond to at least 64 pages of updated data in the cache in order to meet this predetermined criterion. Efficiency, however, is not necessarily the only factor in determining cost-effectiveness. In other embodiments, additional criteria may be weighed together with the efficiency of flushing the particular logical block.

Even if the determined cost-effectiveness fails to meet the predetermined criterion, there may be scenarios in which non-cost-effective flushing of logical blocks from cache storage 16 is necessary despite the undesirable wear (e.g. a potentially inefficient and wasteful Write/Erase cycle) this may cause. For example, if the cache storage 16 is significantly full, and none of the cached logical blocks are determined to be cost-effective to flush out, there may be no choice but to flush a non cost-effective block. Otherwise, the cache storage 16 will get too full and might "starve" the host 10 by not being able to accept more input. Typically such cases are rare, but the cost-effectiveness criterion may be overridden if the situation so requires. Thus, the processor 20 may determine if the cache storage 16 is significantly full, which may be a simple comparison of current cache storage availability to a minimum availability threshold, and, if the current cache storage availability is less than the threshold, a cache flush operation may be performed until the current cache storage availability increases to reach the threshold (at 68). In one embodiment, a minimum availability threshold may be 10% of the cache storage size. If the cache storage 16 becomes too full and falls below the minimum availability threshold, logical blocks may be selected using the same cost-effectiveness criteria, or a variation of those criteria, described herein for when the cache is not full. Generally, the selection may be made by computing the cost-effectiveness for each logical block and picking the one with the highest score.

If it is determined that the cost-effectiveness meets the predetermined criteria, the portion of data from the cache for which the desired cost-effectiveness has been shown will be copied from the cache storage 16 to the main storage 18 (at 66, 70). Conversely, if the cache fullness is less than a maximum threshold (current cache availability greater than a minimum availability threshold) but the portion of data for which cost-effectiveness has been determined does not meet the predetermined criteria, that portion of data will not be flushed from cache storage 16 to main storage 18 regardless of whether the storage device 12 is idle (at 66, 68).

Certain factors, in addition to or independent of general block flushing efficiency, which may comprise part of the cost-effectiveness criterion include whether a given logical block might have its associated data located in physical blocks of cache storage 16 in a way that flushing the data associated with the logical block frees up an entire physical block of the cache. This might happen, for example if other pages in the physical block have already been flushed and only the pages corresponding to the currently-evaluated logical block still reside in that physical block in cache storage 16. In one implementation, where freeing an entire physical block of the cache is considered as part of the cost-effectiveness determination, the predetermined criterion may be that the logical block have either a first number or percentage of updated pages when an entire physical block of cache storage is not released, or a second number or percentage of updated pages if copying the logical block of the stored data will release the entire physical block of cache storage. The second number or percentage would preferably be less than the first to reflect the added benefit of freeing an entire physical block from cache storage.

Another factor available for evaluating cost-effectiveness, usable in conjunction with, or independently of, one or more of the factors identified above is whether data corresponding to an evaluated logical block is scattered in many cache storage physical blocks. The overhead of tracking the logical-to-physical mapping in the cache storage 16 may be significant and, because it is highly desirable to eliminate scattered blocks from the cache storage 16, the processor 20 may consider the cost-effectiveness of flushing such a logical block as increased in this situation. Thus, in one implementation, the predetermined criterion that the cost-effectiveness determination is compared to may include the factor of the number of physical blocks in the cache storage 16 that contain data related to a particular logical block. For example, the predetermined criterion may simply be a fixed number of physical blocks in cache storage 16 contain data for a logical block, such that any logical block with associated data in at least that fixed number of physical cache blocks will be flushed. Alternatively, the number of physical cache blocks containing data corresponding to a logical block may be used as one of several factors in the cost-effectiveness analysis to, for example, offset the block flushing efficiency required for the logical block to meet the necessary cost-effectiveness.

With the exception of the cache storage 16 being too full to accept a sufficient amount of data from a host 10, a logical block will not be flushed out of the cache storage 16 if its cost-effectiveness does not meet the predetermined criterion. The test of determining whether the cost-effectiveness of flushing a particular logical block meets a predetermined criterion may be applied like a logical rule or a flowchart. An example of one logical rule that may be applied by the processor to logical blocks of data, may include determining whether the logical block under consideration has a minimum number of pages in the cache storage 16 or whether the pages of a logical block are scattered over at least some minimum number of cache blocks. So, for example, if the minimum number of pages was set at eight and the minimum number of physical cache blocks containing data associated with the logical block was set at five, then cost-efficiency for flushing would be found if either there were eight or more pages in cache storage 16, or five or more physical blocks in the cache storage, that contained data corresponding to the logical block.

In other embodiments, the predetermined criterion may be a numeric formula compared to a threshold. An example of a numeric formula, may be a formula including a first parameter multiplied by the number of pages in the cache corresponding to the logical block added to a second parameter multiplied by a number of physical cache blocks that the data associated with the logical block resides in. The resulting "score" of this equation may be compared to a threshold number:

$X*$ (pages in cache)$+Y*$(number of physical cache blocks)$=Z$ where X and Y may be predetermined constants and the resulting score Z is compared to a threshold number to determine if Z is greater than, or greater than or equal to, the threshold. So, if the multipliers X and Y are 10 and 5, respectively, and the threshold score (Z) needs to be greater than 60 to flush a logical block, the processor 20 would calculate the Z for each logical block and flush those that exceed the threshold of 60. Variations of this formula to add or remove additional criteria, change the constants or use other weighting factors are also contemplated. In other embodiments, the predetermined constants or resulting score may be user configured to suit a particular application. In yet further embodiments, the predetermined constants may instead be implemented as variables based on other criteria.

A method and system has been disclosed for implementing a cache flushing policy that avoids wearing-out of the memory cells in flash memory by not forcing the cache to become fully empty even if the system is idle for a long time. A "cost-effectiveness" criterion is utilized to determine whether flushing a logical block out of the cache is warranted. Whenever a logical block is being considered for flushing, a cost-effectiveness test is applied. The test will typically be a function of the efficiency of flushing the block—the higher the efficiency, the more cost-effective is the flushing of the block. Efficiency, however, is not necessarily the only factor determining cost-effectiveness. Other factors, such as those described above, may be used to increase or otherwise alter the cost-effectiveness for flushing a particular logical block and copying the data associated with the logical block from cache storage 16 to main storage 18 in the storage device 12. A logical block will not be flushed out of the cache if its cost-effectiveness does not pass the test unless the cache storage 16 is too full to accept a desired amount of data from the host 10.

A result of adopting the disclosed cache flushing policy is that the cache does not necessarily become fully empty even if the storage system is idle for a long time. If logical blocks currently represented in the cache storage are not cost-effective enough to justify wasting an erase cycle of a physical block for them, they will not be flushed and the data corresponding to the logical blocks will remain in cache storage. Thus, even though such a cache clearing policy would seem counterintuitive and undesirable from a performance-only view point, because the cache storage 16 would be unable to absorb as much burst input when a host 10 next sends write commands, a storage device 12 incorporating the versions of cache clearing policy discussed above may lessen the Write/Erase wear that may reduce the life of the storage device 12.

I claim:

1. A method of managing movement of data from a cache storage to a main storage in a storage device in which incoming data received in write commands from an external host are first stored in the cache storage and later moved to the main storage, the method comprising:
   storing data received from the external host in the cache storage;
   determining a cost-effectiveness to copy at least a portion of the stored data from the cache storage to the main storage, wherein determining the cost-effectiveness comprises determining a number of physical blocks in the cache storage having data associated with a logical block corresponding to the at least a portion of the stored data; and
   if an available capacity of the cache storage is greater than a minimum capacity parameter, copying the at least a portion of the stored data from the cache storage to the main storage only if the cost-effectiveness to copy the at least a portion of the stored data satisfies a predetermined criterion.

2. The method of claim 1, wherein the predetermined criterion comprises a percentage of updated pages in the logical block.

3. The method of claim 1, wherein the predetermined criterion comprises either a percentage of updated pages in the logical block or a minimum number of physical blocks of cache storage having data associated with the logical block.

4. The method of claim 1, further comprising:
   copying the at least a portion of the stored data from the cache storage to the main storage regardless of the determined cost-effectiveness if the available capacity is less than the minimum capacity parameter.

5. A method of managing movement of data from a cache storage to a main storage in a storage device in which incoming data received in write commands from an external host are first stored in the cache storage and later moved to the main storage, the method comprising;
   storing data received from the external host in the cache storage;
   determining a cost-effectiveness to copy at least a portion of the stored data from the cache storage to the main storage;
   if an available capacity of the cache storage is greater than a minimum capacity parameter, copying the at least a portion of the stored data from the cache storage to the main storage only if the cost-effectiveness to copy the at least a portion of the stored data satisfies a predetermined criterion;
   wherein the predetermined criterion comprises a first percentage of updated pages in a logical block if flushing the logical block will not release an entire physical block of cache storage, or a second percentage of updated pages in the logical block if flushing the logical block will release an entire physical block of cache storage.

6. A method of managing movement of data from a cache storage to a main storage in a storage device in which incoming data received in write commands from an external host are first stored in the cache storage and later moved to the main storage, the method comprising:
   receiving data from the external host at the storage device;
   storing the received data in the cache storage;
   determining a cost-effectiveness to copy at least a portion of the stored data from the cache storage to the main storage, wherein determining the cost-effectiveness comprises determining a number of physical blocks in the cache storage having data associated with a logical block corresponding to the at least a portion of the stored data; and
   if an available capacity of the cache storage is greater than a minimum capacity parameter, preventing copying of the at least a portion of the stored data from the cache storage to the main storage while the storage device is in an idle state unless the determined cost-effectiveness meets a predetermined criterion.

7. The method of claim 6, wherein the predetermined criterion comprises a percentage of updated pages in the logical block.

8. The method of claim 6, wherein the predetermined criterion comprises either a percentage of updated pages in the logical block or a minimum number of physical blocks of cache storage having data associated with the logical block.

9. The method of claim 6, further comprising:
   copying the at least a portion of the stored data from the cache storage to the main storage regardless of the determined cost-effectiveness if the available capacity is less than the minimum capacity parameter.

10. A method of managing movement of data from a cache storage to a main storage in a storage device in which incoming data received in write commands from an external host are first stored in the cache storage and later moved to the main storage, the method comprising:
    receiving data from the external host at the storage device;
    storing the received data in the cache storage;
    determining a cost-effectiveness to copy at least a portion of the stored data from the cache storage to the main storage and
    if an available capacity of the cache storage is greater than a minimum capacity parameter, preventing copying of the at least a portion of the stored data from the cache storage to the main storage while the storage device is in an idle state unless the determined cost-effectiveness meets a predetermined criterion;
    wherein the predetermined criterion comprises a first percentage of updated pages in a logical block if flushing the logical block will not release an entire physical block of cache storage, or a second percentage of updated pages in the logical block if flushing the logical block will release an entire physical block of cache storage.

11. A method of managing movement of data in a storage device having a cache storage and a main storage comprising:

receiving at the storage device a data write command from a host;

storing data received with the data write command in the cache storage;

detecting an available capacity in the cache storage;

if the detected available capacity is less than a minimum capacity parameter, copying at least a portion of the stored data from the cache storage to the main storage; and if the detected available capacity is greater than or equal to the minimum capacity parameter, then:

determining a cost-effectiveness to copy the at least a portion of the stored data from the cache storage to the main storage, wherein the cost effectiveness is based on at least two parameters relating to the at least a portion of the stored data in the cache storage, and wherein a first of the at least two parameters comprises a number of updated pages in a logical block corresponding to the at least a portion of the stored data;

wherein the at least two parameters further comprise a number of physical blocks in the cache storage having data associated with the logical block; and copying the at least a portion of the stored data to the main storage only if the determined cost-effectiveness satisfies a predetermined criterion.

12. The method of claim 11, wherein a second of the at least two parameters comprises whether an entire physical block of the cache storage will be released if the logical block corresponding to the at least a portion of the stored data is copied.

13. A non-transitory processor readable medium comprising processor executable instructions for implementing a cache clearing policy in a self-caching storage device, the processor executable instructions configured to cause a processor to perform acts of:

storing data received from a host in a cache storage;

determining a cost-effectiveness to copy at least a portion of the stored data from the cache storage to a main storage;

if a current available capacity of the cache storage is greater than or equal to a minimum capacity, copying the at least a portion of the stored data from the cache storage to the main storage only if the cost-effectiveness to copy the at least a portion of the stored data satisfies a predetermined criterion; and wherein the predetermined criterion comprises a first percentage of updated pages in a logical block corresponding to the at least a portion of the stored data if copying the logical block will not release an entire physical block of cache storage, or a second percentage of updated pages in the logical block if copying the logical block will release an entire physical block of cache storage.

14. A non-transitory processor readable medium of claim 13, wherein the predetermined criterion comprises a percentage of updated pages in the logical block corresponding to the at least a portion of the stored data.

15. A non-transitory processor readable medium of claim 13, further comprising processor executable instructions configured to cause a processor to perform acts of copying the at least a portion of the stored data from the cache storage to the main storage regardless of the determined cost-effectiveness if the current available capacity is less than the minimum capacity.

16. A storage device comprising:

a cache storage configured for receiving data associated with host write commands;

a main storage in communication with the cache storage and configured to receive data transferred from the cache storage;

a controller arranged to manage transfer of the data associated with host write commands from the cache storage to the main storage, wherein the controller is configured to determine a cost-effectiveness to copy at least a portion of the stored data from the cache storage to the main storage, and, if an available capacity of the cache storage is greater than a minimum capacity parameter, to copy the at least a portion of the data from the cache storage to the main storage only if the cost-effectiveness satisfies a predetermined criterion; and wherein the predetermined criterion comprises a first percentage of updated pages in a logical block if flushing the logical block will not release an entire physical block of cache storage, or a second percentage of updated pages in the logical block if flushing the logical block will release an entire physical block of cache storage.

17. The storage device of claim 16, wherein the predetermined criterion comprises a percentage of updated pages in the logical block.

18. The storage device of claim 16, wherein the controller is further configured to determine the cost-effectiveness based on whether an entire physical block of the cache storage will be released if the at least a portion of the stored data is copied to the main storage.

19. The storage device of claim 16, wherein the controller is further configured to determine the cost-effectiveness based on a number of physical blocks in the cache storage having data associated with the logical block.

20. The storage device of claim 16, wherein the predetermined criterion comprises either a percentage of updated pages in the logical block or a minimum number of physical blocks of cache storage having data associated with the logical block.

21. The storage device of claim 16, wherein the controller is further configured to copy the at least a portion of the stored data from the cache storage to the main storage regardless of the determined cost-effectiveness if the available capacity is less than the minimum capacity parameter.

22. A storage device comprising:

a cache storage configured for receiving data associated with host write commands;

a main storage in communication with the cache storage and configured to receive data transferred from the cache storage; and a controller configured to:

receive data at the storage device from an external host;

store the received data in the cache storage;

determine a cost effectiveness to copy at least a portion of the stored data from the cache storage to the main storage, wherein determining the cost-effectiveness is based on a number of physical blocks in the cache storage having data associated with a logical block; and prevent copying of the at least a portion of the stored data from the cache storage to the main storage while the storage device is in an idle state unless the determined cost effectiveness satisfies a predetermined criterion or a current available capacity of the cache storage is less than a minimum capacity.

23. The storage device of claim 22, wherein the predetermined criterion comprises a percentage of updated pages in the logical block.

24. The storage device of claim 22, wherein the controller is further configured to determine the cost-effectiveness based on whether an entire physical block of the cache storage will be released if the at least a portion of the stored data is copied to the main storage.

25. The storage device of claim 22, wherein the predetermined criterion comprises a first percentage of updated pages in the logical block if flushing the logical block will not release an entire physical block of cache storage, or a second percentage of updated pages in the logical block if flushing the logical block will release an entire physical block of cache storage.

26. The storage device of claim 22, wherein the predetermined criterion comprises either a percentage of updated pages in the logical block or a minimum number of physical blocks of cache storage having data associated with the logical block.

* * * * *